US007852809B2

(12) United States Patent
Oberle et al.

(10) Patent No.: US 7,852,809 B2
(45) Date of Patent: Dec. 14, 2010

(54) METHOD OF PROVIDING SESSION MOBILITY

(75) Inventors: Karsten Oberle, Mannheim (DE); Stefanie Braun, Stuttgart (DE); Volker Bales, Neuheilenbach (DE)

(73) Assignee: Alcatel Lucent, Stuttgart (DE)

( * ) Notice: Subject to any disclaimer, the term of this patent is extended or adjusted under 35 U.S.C. 154(b) by 517 days.

(21) Appl. No.: 11/672,990

(22) Filed: Feb. 9, 2007

(65) Prior Publication Data

US 2007/0189220 A1    Aug. 16, 2007

(30) Foreign Application Priority Data

Feb. 15, 2006   (EP)   ................... 06290281

(51) Int. Cl.
*H04W 4/00*   (2009.01)
(52) U.S. Cl. .................. 370/331; 370/310; 370/389; 370/902; 455/432.1; 455/436
(58) Field of Classification Search ............. 455/432.1, 455/433, 437, 438, 439, 442; 370/331, 310, 370/389, 902
See application file for complete search history.

(56) References Cited

U.S. PATENT DOCUMENTS

| 7,184,418 | B1* | 2/2007 | Baba et al. .................. 370/331 |
| 2004/0233866 | A1 | 11/2004 | Bossoli et al. |
| 2006/0009232 | A1* | 1/2006 | Vakil et al. .................. 455/453 |
| 2006/0209768 | A1* | 9/2006 | Yan et al. .................... 370/338 |
| 2006/0245574 | A1* | 11/2006 | Phelps et al. ................ 379/229 |
| 2006/0285493 | A1* | 12/2006 | Manuja et al. .............. 370/235 |
| 2006/0294245 | A1* | 12/2006 | Raguparan et al. ......... 709/227 |
| 2007/0242628 | A1* | 10/2007 | Dutta et al. .................. 370/310 |

FOREIGN PATENT DOCUMENTS

WO    WO 2005/002267 A2    1/2005

OTHER PUBLICATIONS

Valid et al: "A SIP-based Method for Intra-Domain Handoffs" Internet Citation, [Online] 2003, pp. 1-5, XP002394796.
Schulzrinne H et al: "Application-Layer Mobility Using SIP", Mobile Computing and Communications Review, ACM, New York, NY, US, vol. 4, No. 3, Jul. 2000, pp. 47-57, XP000992003, ISSN: 1091-1669, chapters III, III.B.2 and IV.
Wedlund E et al: "Mobility Support Using SIP" ACM/IEEE International Conference on Wireless and Mobile Multimedia, 1999, pp. 76-82, XP002942550, chapter 3.2.

* cited by examiner

*Primary Examiner*—Kent Chang
*Assistant Examiner*—Dinh P Nguyen
(74) *Attorney, Agent, or Firm*—Harness, Dickey & Pierce

(57) ABSTRACT

The invention concerns a method of providing session mobility to an IP based real-time session in a telecommunications network whereby the telecommunications network uses the session initiation protocol for the setup and control of the session. The session comprises a media stream between a first terminal associated to a first network access point of the telecommunications network and a second terminal associated to a second network access point of the telecommunications network. A re-invite session initiation protocol signalling message related to session mobility of said session is intercepted at a session-related session border controller of the telecommunications network. Said session border controller initiates a corresponding session hand-over of said session. In said session hand-over, the media stream of said session is redirected to a new network access point of the first terminal and/or a new terminal.

10 Claims, 3 Drawing Sheets

METHOD OF PROVIDING SESSION MOBILITY

The present invention is based on a priority application EP 06 290 281.2 which is hereby incorporated by reference.

TECHNICAL FIELD

The present invention relates to a method of providing session mobility to an IP based real-time session in a telecommunications network, and to a session border controller for executing this method.

BACKGROUND OF THE INVENTION

With a growing variety of telecommunication terminals and service providers, there is increasing demand for session mobility across networks and technology borders. The term "session mobility" means the transfer of an already existing session from a first device to another device, i.e., involving a terminal change, and/or from a first network access point to another network access point. For example, a network access domain change may comprise the hand-over of an on-going mobile telephone session from a GSM domain to a WLAN domain (GSM=Global System for Mobile Communications; WLAN=Wireless Local Area Network).

Usually, discussions on this topic have a broadly based scope due to the multitude of possible scenarios, i.e., different types of mobility, homogeneous/heterogeneous access networks, converged fixed/mobile networks, single/multi-operator environments, etc. In particular, the prospect of future converged fixed/mobile multi-operator networks such as IMS/TISPAN have fuelled the search for a seamless hand-over technique in a heterogeneous network access environment based on packet switching (IMS=Internet Protocol Multimedia Subsystem; TISPAN=Telecommunications and Internet converged Services and Protocols for Advanced Networks).

Currently discussed solutions use mobility capabilities provided by SIP or mobile IP technology developed for mobile networks (SIP=Session Initiation Protocol; IP=Internet Protocol). However, these approaches have significant handicaps. Mobility mechanisms provided by the SIP community, using a re-invite message to redirect a session, have a major drawback in terms of privacy because the user agent server (=UAS), i.e., the called party, can observe that the moving user agent client (=UAC), i.e., the calling party, is in motion.

Within the SIP framework, when a UAC desires to initiate a session (e.g., audio, video, or a game), it generates an invite request. The invite is a request that is sent to establish a session. This request may be forwarded by proxies, eventually arriving at a UAS that can potentially accept the invitation. Once a session has been established under SIP, the need may arise to communicate changes to the existing SIP session, for instance to add a media stream, to change the codec used for a voice media stream or the updating of the session timer.

Modifying an existing session can also involve changing addresses or ports. For example, when a mobile node such as a notebook computer, PDA or mobile phone moves from one point of attachment (wired or wireless) to another point of attachment, that node may be assigned a new IP address. The communication of changed IP address to the existing SIP session is accomplished by sending a re-invite containing a new media description. This re-invite references the existing dialog so that the other party knows that it has to modify an existing session instead of establishing a new session. An invite request sent within an existing dialog is known as a re-invite. It is at this point that the other party learns that the requesting party is in motion.

The mobile IP technology has even two major disadvantages. First, the session hand-over is rather slow, so there is no seamless session continuity. Second, there are many additional signalling messages, additional packet overhead for IP in IP, and all packets have to be routed through the home network of the provider.

WO 2005/002267 describes a method for ensuring continuity of a communication session when a user equipment hands over from a first communication network to a second cellular communication network comprising the steps of performing an authentication procedure for a packet data session with the second network whilst still being attached to the first network and simultaneously performing a packet data session establishment procedure with the second network whilst still being attached to the first network.

US 2004/0233866 A1 discloses a method of a non-real time software download in an IP-based mobile communication system with heterogeneous access technologies based on the SIP. For download recovery in case of hand-over between a first and a second access network using different access technologies while a software download session is ongoing, the SIP user agent associated with a hand-overing terminal, upon detecting the hand-over, sends, without releasing the ongoing session, a transfer request message to a SIP proxy server that has set up and is currently managing the download session, and that server can start operations necessary in order a new session is set up with the user agent in the new location, under the control of a proxy server entrusted with managing the new session, and download is resumed from said last received packet.

SUMMARY OF THE INVENTION

It is the object of the present invention to provide improved session mobility to a conversational real-time session.

The object of the present invention is achieved by a method of providing session mobility to an IP based real-time session in a telecommunications network using SIP for the setup and control of the session, whereby the session comprises a media stream between a first terminal associated to a first network access point of the telecommunications network and a second terminal associated to a second network access point of the telecommunications network, wherein the method comprises the steps of intercepting a re-invite SIP signalling message related to session mobility of said session at a session-related session border controller (=SBC) of the telecommunications network, initiating a corresponding session hand-over of said session by said SBC, and redirecting in said session hand-over the media stream of said session to a new network access point of the first terminal and/or a new terminal. The object of the present invention is further achieved by a SBC of a telecommunications network for providing session mobility to an IP based real-time session in the telecommunications network using SIP for the setup and control of the session, whereby the session comprises a media stream between a first terminal associated to a first network access point of the telecommunications network and a second terminal associated to a second network access point of the telecommunications network, wherein the SBC comprises a control unit adapted to intercept a re-invite SIP signalling message related to session mobility of said session, and initiate a corresponding session hand-over of said session wherein the media stream of said session is redirected to a new network access point of the first terminal and/or a new terminal.

The present invention supports session mobility of SIP based conversational real-time services, such as VoIP or MMoIP, in NGN systems using SIP for the setup and control of this session, even in a cross-operator scenario (VoIP=Voice over IP; MMoIP=Multimedia over IP; NGN=Next Generation Network).

The present invention provides a method to support session mobility using standardised SIP signalling messages, e.g., re-invite, without the drawbacks of the previous art. The present solution hides the movement of the UAC in motion to the UAS and as a consequence maintains the privacy.

Further advantages are achieved by the embodiments of the invention indicated by the dependent claims.

According to a preferred embodiment of the invention, said re-invite SIP signalling message is generated by said first terminal or said new terminal on a corresponding trigger event. The trigger event may be a dedicated action of a user of the first or new terminal or may be automatically detected when a change of circumstances or environmental parameters occurs. Said SBC monitors all the IP based real-time sessions that are operated via said SBC in order to detect and intercept an appropriate re-invite SIP signalling message indicating a hand-over request.

Within the context of SIP, the terms UAC and UAS are used to refer to a requesting unity and an answering unity, respectively. A user agent, either client or server, may be a SIP related program running on a user device such as a telecommunication terminal. That means, a UAC and UAS will be functional in association with terminals, only. Within the context of this description, the terms UAC and UAS and terminal will be used interchangeably to refer to endpoints of session streams. At these endpoints, terminal users who are subscribers to the described service can make input and receive output.

Each SIP message contains session-related parameters, such as address information and/or session ID information, that allow the SBC to determine which of the operated sessions the received SIP message is associated to (ID=Identification/identifier). Thus, the SBC is able to detect said re-invite SIP signalling message based on said session-related parameters. After detection of said hand-over related re-invite SIP signalling message, the SBC adapts existing bindings assigned to media packets of the session for said redirection of the media stream to the new terminal and/or new network access point.

According to another preferred embodiment of the invention, the SBC compares session ID information and/or address information of re-invite session initiation protocol signalling messages received at said SBC with session ID information and/or address information of one or more IP based real-time sessions operated via said SBC. The SBC may maintain and/or refer to a database where data on the sessions operated by the SBC are filed and kept up-to-date. Thus, the SBC may readily find out whether a received re-invite SIP signalling message contains session ID information and/or address information that matches session ID information and/or address information of sessions operated via the SBC. If based on said comparison a matching session is found, the SBC registers a received re-invite session initiation protocol signalling message as associated with the matching IP based real-time session operated via said SBC.

According to another preferred embodiment of the invention, the SBC first checks whether a received re-invite SIP signalling message contains session-related information, e.g., a session ID or an address information, which matches with any of the session operated via the SBC. If a matching session exists, the SBC is prompted to process the received re-invite SIP signalling message, otherwise the SBC will forward the received re-invite SIP signalling message to the next network node, e.g., another SBC. If a matching session exists but an address information contained in the received re-invite SIP signalling message does not match with address information associated with said matching session, the SBC will treat the received re-invite SIP signalling message as related to a session hand-over from the first network access point of the first terminal to the new network access point of the first terminal.

In a preferred embodiment, if session ID information of a re-invite SIP signalling message received at a SBC does not match with session ID information of any IP based real-time sessions operated via said SBC, the SBC checks whether the received re-invite SIP signalling message originates from a new terminal of a know session subscriber. A session subscriber may have participated a session from a first terminal but now initiates to hand over the session to another terminal. Preferably, the subscriber sends a re-invite SIP message from the new terminal. However, the new terminal is assigned to an IP address hitherto unknown to the SBC. So, the SBC may access a data base comprising session user data of subscribers to sessions operated via the SBC.

For example, the data base may comprise address data and/or device ID information of devices and access points used by and/or associated to the session subscribers "known" to the SBC. The SBC looks up whether address data and/or device ID information comprised within the received re-invite SIP message exists in the session user data of the session subscribers participating in session operated via the SBC. The SBC tests by means of said session user data whether a terminal where said re-invite session initiation protocol signalling message was received from and a terminal associated to one of said IP based real-time sessions operated via said session border controller are assigned to a same subscriber. If said test shows that said terminals are associated to the same user, the SBC has to verify that said subscriber really wishes a hand-over of an existing session to the new terminal or whether the subscriber wishes to initiate another session from the new terminal. So the SBC may request a confirmation of the session hand-over from one of the user's terminals. If the SBC receives a confirmation from the subscriber that the subscriber actually wishes a hand-over, the SBC determining said re-invite SIP signalling message as related to a session hand-over from the first terminal to the new terminal.

According to another preferred embodiment of the invention, a hand-over related re-invite SIP signalling message is generated at said first terminal or said new terminal of a session subscriber. The subscriber may initiate the generation of said hand-over related re-invite SIP signalling message by inputting a corresponding command to said first terminal or said new terminal, e.g., by pressing a key on a keypad of one of said terminals. But it is also possible that the subscriber has adapted their terminals such that the terminals automatically set off said hand-over related re-invite SIP signalling message whenever a pre-defined event occurs, e.g., when the terminal enters the coverage area of another network access point like a WLAN hotspot.

Preferably, the SBC processing said hand-over related re-invite SIP signalling message makes sure that said second terminal does not realise the existence of said hand-over related re-invite SIP signalling message. The SBC prevents that the second terminal receives the re-invite SIP signalling message and any other messages indicating said session hand-over. By the blocking of any information about the hand-over related re-invite SIP signalling message with respect to the second terminal, the invention keeps the privacy of the moving subscriber.

In server applications, a binding is an association between a network connection point, e.g., the combination of an IP address and a port number, and a network service such as a mail server or web proxy. This defines the interface over which a server process will provide service to clients. Therefore, in order for a service to be accessible to a client, it must be "bound" to an interface that is accessible to the client computer. Bindings allow client PCs to connect to network services, and allow the administrator to specify which service will respond to connections on which interfaces and ports. Preferably, said control unit is adapted to modify bindings on a layer of said media stream. Due to the fact that the UAS, i.e., the second terminal, should not detect any changes to keep privacy for the UAC, i.e., the moving subscriber, the SBC has to modify existing bindings to switch/redirect packets sent by the UAS in direction of the original UAC/terminal/access point in direction of the new UAC/terminal/access point. The SBC uses knowledge based on said re-invite session initiation protocol signalling message and/or other session initiation protocol signalling messages associated with the hand-over session.

According to another preferred embodiment of the invention, the control unit is adapted to divide the session into two parts, whereby the first session part is between the first terminal/access point and the new terminal/access point, respectively, and the session border controller, and whereby the second session part is between the session border controller and the second terminal/access point. Said second session part is not changed or touched during the hand-over; all modifications relate to the first part, only.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF PREFERRED EMBODIMENTS

Figure 1:
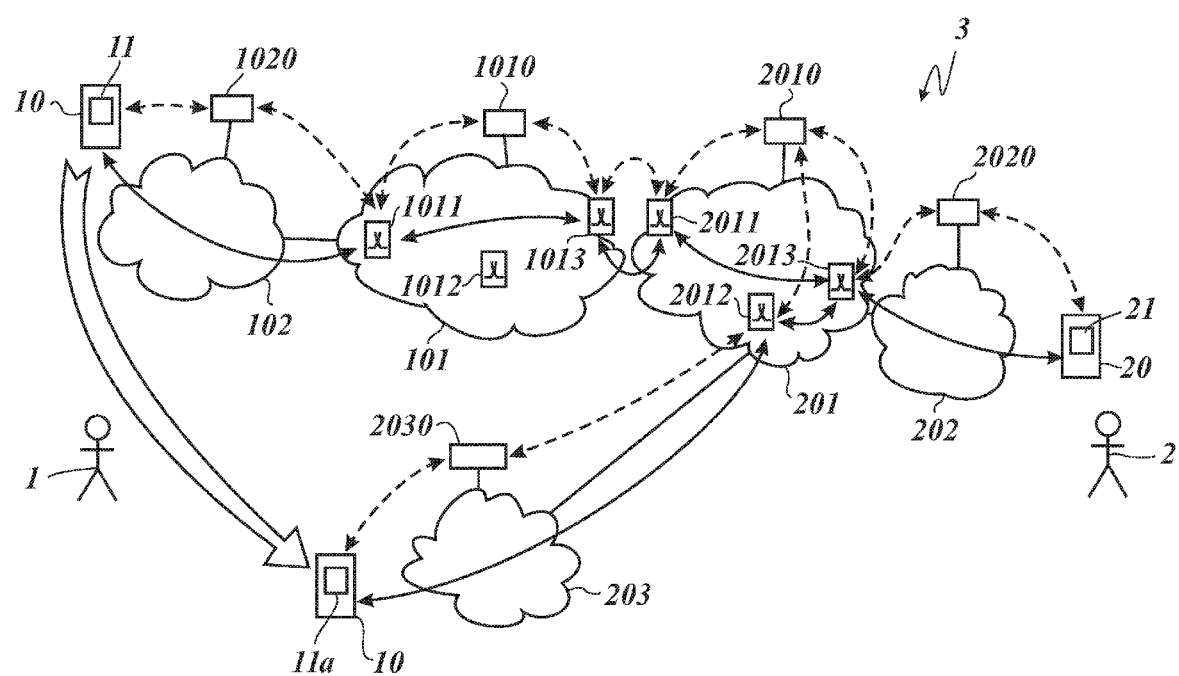
FIG. 1 is a block diagram of a telecommunications network according to an embodiment of the invention.

FIG. 1 shows a packet-based telecommunications network 3 comprising two interconnected home networks, i.e., a first home network 101 and a second home network 201, and several network access points 102, 202, 203. The network access point 102 is connected to the home network 101, the network access points 202 and 203 are connected to the home network 201. The network access points 102, 202, 203 may be domains or access networks. A first subscriber 1 may be assigned to a first terminal 10 which provides the first subscriber 1 with access to the first subscriber's home network 101 via the network access point 102. A second subscriber 2 may be assigned to a second terminal 20 which provides the second subscriber 2 with access to the second subscriber's home network 201 via the network access point 202.

The terminal 10 may be a multimodal terminal providing access to the network via different access modes, e.g., a mobile phone operable under GSM, UMTS, and WLAN (UMTS=Universal Mobile Telecommunications System). The telephone terminal 20 may be a wire-line VoIP phone. In a preferred embodiment, the terminals 10, 20 are capable to handle IP based conversational real-time services such as VoIP or MMoIP in NGN systems using SIP protocol for the setup and control of a session. Preferably, on both terminals 10, 20 SIP user agents 11, 21 are installed which provide the terminals with the appropriate SIP functionality. If a terminal initiates a SIP message dialog, its user agent is referred to as a user agent client. Correspondingly, the other user agent installed on the answering terminal is referred to as user agent server.

The VoIP telephone terminal 20 is an IP phone or a computer executing an IP phone client 21. For example, this terminal 20 is a SIP phone or a computer executing a SIP client 21. According to a specific embodiment of this invention, the VoIP telephone terminal 10 is a small mobile terminal with low weight, small dimension and reduced functionality, whereas the VoIP phone terminal 20 is a convenient fixed terminal, for example a computer with a SIP client and a wide choice of functions.

Each of the network access points 102, 202, 203 may be operated by a different provider (cross operator scenario). However, according to another embodiment of the invention, the terminals 10 and 20 may be connected to network access points 102, 202, 203 which belong to the same provider.

The telecommunications network 3 may be a NGN communication network which is based on a distributed IP network (NGN=Next Generation Network). In a preferred embodiment, the communication network 3 complies with the IMS or the TISPAN standards.

To enable the establishment of communications to their telephone terminals 10 and 20, the subscribers 1 and 2 have to choose a service provider, sign a subscription contract with the service provider, and configurate their telephone terminals 10 and 20 accordingly. For example, the first subscriber 1 chooses a service provider operating the home network 101, which becomes the home network of the first subscriber 1, while the second subscriber 2 chooses a service provider operating the home network 201, which becomes the home network of the second subscriber 2. Telephone configuration data, subscriber data, subscriber preferences, etc. are stored in data bases of HSS modules associated to the home networks 101 and 201 (HSS=Home Subscriber Services). The data stored in the data bases of the HSS modules comprise the necessary information which makes it possible for the telephone terminals 10 and 20 to register themselves to other visited network domains 102, 202, 203.

The home network 101 of the first subscriber 1 comprises a call signalling server 1010 and SBCs 1011, 1012 and 1013 providing a media connection of the home network 101 to the network domain 102 and the second home network 201. The home network 201 of the second subscriber 2, who is a session communication partner of the first subscriber 1, comprises a call signalling server 2010 and SBCs 2011, 2012 and 2013 providing a media connection of the home network 201 to the network domains 202 and 203 and to the other home network 101.

The network access point 102 may be a visited network where the subscriber 1 is currently registered in for use of the telephone terminal 10. It comprises a call signalling server 1020, and is connected to the home network 101 by means of the SBC 1011. The network access point 202 may be a visited network where the subscriber 2 is currently registered in for use of his telephone terminal 20. It comprises a call signalling server 2020, and is connected to the home network 201 by means of the SBC 2013. Likewise, the network access point 203 comprises a call signalling server 2030, and is connected to the second home network 201 by means of the SBC 2012.

In a preferred embodiment, the SBCs 1011, 1012, 1013, 2011, 2012, 2013 are session border controllers controlling real-time session traffic at the media layers as the traffic data packets cross the network borders between the network access points 102, 202, 203 and the home networks 101, 201. Alternatively, the SBCs 1011, 1012, 1013, 2011, 2012, 2013 may be integrated into network elements of the telecommunications network 3 which handle the data traffic associated with communication sessions between the first subscriber 1 and the second subscriber 2. In the described embodiment of the invention, we use the term SBC. However, another possible term denoting the same network element is IP border node. Both terms denote a module with the same functionality with respect to the present invention.

The call signalling servers 1010, 1020, 2010, 2020 and 2030 are part of the control plane of the telecommunications network 3. They provide all control functions for network elements of the transport layer of the telecommunications network 3. For example, the telecommunications network 3 is a pure IP network and the call signalling servers 1010, 1020, 2010, 2020 and 2030 are SIP servers supporting the establishment of VoIP connections through the IP network constituted by the telecommunications network 3, or other network elements provided with the functionality of a SIP server.

In a preferred embodiment, the call signalling servers 1010, 1020, 2010, 2020 and 2030 may possess the functionality equivalent to SIP servers such as I-CSCF, S-CSCF, and P-CSCF (I-CSCF=Interrogating Call Session Control Function; S-CSCF=Serving Call Session Control Function; P-CSCF=Proxy Call Session Control Function).

The first subscriber 1 currently communicates in an IP based real-time session with his communication partner, i.e., the second subscriber 2. For communicating, the first subscriber 1 uses the first telephone terminal 10 hosting a SIP UAC 11. The second subscriber 2 uses the second telephone terminal 20 hosting a SIP UAS 21. The session media traffic between the first telephone terminal 10 and the second telephone terminal 20 is transported across the telecommunications network 3 via the network access point 102 to the SBC 1011 and from there in a hop-by-hop process through the home networks 101 and 201 to the SBC 2013. From there, the session media traffic is transported through the network access point 202 to the terminal 20 of the subscriber 2. The session media traffic may be transported, e.g., via the RTP protocol standard (RTP=Real-time Transfer Protocol).

In parallel to the session data traffic, the session signalling traffic associated with the on-going session between the subscribers 1 and 2 is transported among the terminals 10 and 20, the call signalling servers 1010, 1020, 2010 and 2020, and the SBCs 1013, 2011. The session signalling traffic may be transported, e.g., via the SIP protocol standard.

In FIG. 1, the signalling traffic is shown as dashed arrows, the media traffic is shown as solid arrows. Solid lines simply denote the affiliation of access networks to their home networks.

To open the current SIP session between the SIP UAC 11 and the SIP UAS 21, the SIP UAC 11 sends an invite request via the telecommunications network 3 to the SIP UAS 21. The invite request comprises a header and a body which comprise address information, e.g., the destination SIP URI, i.e., the IP address of the SIP UAS 21, the originator SIP URI, i.e., the IP address of the SIP UAC 11, and session ID information, e.g., a call ID representing a unique ID of the call and a session ID (URI=Universal Resource Identifier). These pieces of information may be read and stored by all SBCs operating the session.

However, the first subscriber 1 wishes to hand over the session without interrupting the session. The first subscriber 1 wants the hand-over of the communication session to be performed without any interruption and without the second subscriber 2 noticing the hand-over of the communication session due to audio and/or video disturbance. That means that the session hand-over has to be performed seamlessly. The hand-over is indicated in FIG. 1 by the outlined arrow.

In a first embodiment, the original terminal 10 used before the hand-over is identical to the terminal 10 used after the hand-over. With regard to the corresponding user agent clients 11 and 11a shown in FIG. 1, only the IP address assigned by the network 3 to the UAC 11 implemented in the terminal 10 is different to the IP address assigned by the network 3 to the UAC 11a implemented in the terminal 10. The session ID stays the same. This means, the first subscriber 1 keeps his terminal 10 while moving the session from the first network access point 102 to the other network access point 203. In this first embodiment, the hand-over comprises a session hand-over with regard to network access points. For example, the first subscriber 1 communicates by means of his mobile phone 10 in a voice call session with the second subscriber 2, e.g., a business partner, while he is walking in a public building. The network access point 102 currently handling the session at the first subscriber's end is a UMTS telecommunications network. However, the first subscriber 1 would like to hand over the session to a WLAN 203 provided by a hotspot in the public building. This would allow him to save money or benefit from a better voice transmission quality.

In a second embodiment; not shown, it is possible that the first subscriber 1 uses a first terminal when connected to the first network access point 102 and another terminal when connected to the other network access point 203. Then, both the IP address assigned to the UAC will change during the session hand-over from the access point 102 to the access point 203. In this second embodiment, the hand-over comprises both a session hand-over with regard to terminals and a session hand-over with regard to network access points. For example, on his way to the office, the first subscriber 1 initiates a call to the second subscriber 2 by means of his mobile telephone. The session is transmitted to the first subscriber 1 via a cell 102 of a mobile telecommunications provider. Arriving at his office, the first subscriber 1 would like to hand-over the session from the mobile telephone to a VoIP wireline phone installed at his desk. The VoIP phone is serviced by means of another access network 203.

In a third embodiment, not shown, one could also imagine that the hand-over comprises only a session hand-over with regard to terminals. For example, the first subscriber 1 communicates with the second subscriber 2 by means of a first mobile telephone. The session streams are transferred to the first mobile telephone via a mobile access network of a mobile telecommunications provider. However, a need arises for the first subscriber 1 to change to another mobile telephone while still in the same mobile access network.

The following description will refer to the first embodiment. However, the same invention applies also to the other embodiments in an analogous manner. The first subscriber 1 may initiate the hand-over by triggering the generation of a corresponding re-invite SIP signalling message. The first subscriber 1 may press a button on the keypad of the terminal 10. It is also possible that the first subscriber 1 has adapted his terminal 10 such that the terminal automatically generates a corresponding hand-over request message whenever the terminal 10 enters a hotspot coverage area giving access to a WLAN. The subscriber 1 may have entered his preferences to the terminal 10, and adapted the control of the terminal 10 such when entering the coverage area of a wireless network access point (WLAN hotspot) the terminal automatically initiates a hand-over to the current WLAN.

A SIP invite message sent after a successful initial invite request, in an existing session dialog, is called re-invite. A SDP is used within a SIP to define session, time and media related parameters, e.g., to determine what type of communication is wanted, what type of codec, and what address and ports are to be used for the communication (SDP=Session Description Protocol). The SDP based description parameters resides in the body of a SIP message. In particular, the SDP descriptor, e.g., contains a session ID and version number in the origin (o) field. If a subscriber is already a member of the session, the session parameters contained in the session description have not changed.

This re-invite message is used in SIP to modify the actual session. This modification can involve changing IP addresses or ports, adding a media stream, deleting a media stream, and so on. The modification of an existing session can either be initiated by the caller or the callee. It is important to know that the full description of the session, not just a change, is sent.

As shown in FIG. 1, signalling (SIP) and media (RTP) flows of a logically bidirectional UDP-based voice/multimedia session are realised in a hop-by-hop principle with interposed SBC nodes 1011, 1013, 2011, 2013 acting as media (RTP) and as SIP proxies, e.g., back-to-back user agent (UDP=User Datagram Protocol). According to FIG. 1, the first subscriber 1 wishes a session move from the terminal 10 associated to the network access point 102 to the terminal 10 associated to the network access point 203.

If the first subscriber 1 moves the existing session from the network access point 102 to the network access point 203 using the SIP message re-invite, this re-invite message has to be intercepted by an appropriate SBC. Let us assume that the re-invite message is generated at the terminal 10, addressed to the UAS 20 and sent via the network access point 203 to the SBC 2012.

But re-invite messages are only intercepted when a session move is recognised by the SBC which has means for that detection, e.g. by a change of an IP address in the SDP description. The appropriate SBC is distinguished by connectivity to both the original terminal 10 and the terminal 10 after the hand-over, by the fact that the call state awareness for the existing session is available, and that the re-invite passes this SBC node. In the example of FIG. 1, the appropriate SBC is SBC 2013 where the terminal 10 before and the terminal 10 after the hand-over are connected to, the call state awareness for the existing session is available and the re-invite passes this SBC 2013.

SBC 2012 is the first SBC which receives the re-invite message from the terminal 10 via the new access network 203. However, SBC 2012 has no connectivity to the terminal 10 via the original access network 102 and no call state awareness on the existing session handled among others by SBC 1011 and SBC 2013. As a consequence, SBC 2012 does not recognise this re-invite message from the moved terminal 10 as re-invite and forwards the message in direction of the UAS 21. SBC 2013 as first common SBC for both UACs 11 and 11a and with call state awareness of the existing session intercepts the detected re-invite for session movement from the network access point 102 to the network access point 203.

A SBC usually will act as a transfer node for one or more sessions of the network. For simplicity, we have only shown one session in FIG. 1. In reality, a multitude of concurrent sessions of different subscribers will be handled over the home networks 101 and 102, and the network access points 102, 202, 203.

Therefore, each SBC of FIG. 1 usually will handle and monitor one or more sessions; the SBC is said to be session-related with regard to a specific session. Whenever a SBC receives an invite message, it first checks whether the invite message is related to one of the sessions operated by the SBC. This is achieved by extracting address data and session ID data from the invite message and comparing these data with corresponding data extracted from the normal SIP messages. For each SIP session handled, i.e., forwarded by a SBC, the SBC may extract address information and session ID information from the header and the body of the handled SIP messages.

These data may be stored as session user data either remotely on the SBC or kept in a separate and central data base for the network 3. For executing a comparison, the SBC may retrieve the corresponding data from the data base and examine whether they match with the data of the invite message. If both the address information and the session ID information of a received invite message are identical to the corresponding data of one of the sessions handled by the SBC, this received invite message is not a re-invite message related to a hand-over but is a "normal" re-invite message. This is because neither the IP addresses have changed, i.e., the sending UAC is attached to the network 3 by means of the original network access point, nor the session ID has changed, i.e., no new terminals are involved. In this case of a "normal" re-invite message, the SBC may forward the re-invite message to its destination, usually the UAS 21.

On the other hand, if a SBC determines that session ID information of the received invite message is identical to the session ID information of one of the sessions handled by the SBC, but one of the IP addresses contained within the invite messages has changed with respect to the IP addresses known from the sessions handled by the SBC, the invite message is a re-invite message related to a hand-over from a first network access point to a new network access point. This is because a terminal, once it is attached to a new network access point, is assigned a new IP address from the network resources.

For example, a subscriber makes a VoIP mobile telephone call over a UMTS network. The mobile telephone is assigned a dedicated IP address from the UMTS network resources. Once the subscriber comes into the coverage area of a WLAN, and the subscriber approves the registration of his mobile telephone to the WLAN, the mobile telephone is also assigned a second IP address from the WLAN resources. Therefore, during the hand-over the IP address of the moving device will change while the session ID identifying the ongoing session stays the same.

In a third case, a SBC determines that neither the address information nor the session ID information of a received invite message match with the corresponding data of one of the sessions handled by the SBC. Then this may be taken as a sign that the received invite message is not relevant for this specific SBC. In this case, the SBC will simply forward the invite message. However it is also possible that the SBC, preferably a SBC according to the present invention, first checks whether the device, where the unknown IP address is assigned to, belongs to a subscriber of one of the sessions handled by the SBC. Data about a subscriber of a session may have been accumulated as session user data in a database. For instance, if a subscriber frequently logs into the network via any of three different devices, the system may determine that the three devices belong to a single subscriber, e.g., by means of postal address data or bank account data provided by the subscriber when registering the devices.

Thus, the system, and in particular each of the SBCs of FIG. 1, may be enabled to test whether a device belongs to a known subscriber. For example, the SBC may find on the basis of said session user data that an IP address contained in a received invite message is assigned to a device which belongs to a subscriber already online and communicating in an on-going session. At this point however, the SBC must not simply assume that the subscriber wishes a hand-over from a first terminal to a new terminal, e.g., from a mobile terminal to a wireline office telephone. It could also be possible that the subscriber does not want a hand-over but instead wants to establish a new, separate call via the other device.

Therefore, the SBC has first to verify whether the subscriber wants a hand-over, i.e., if the received invite message must be regarded as a re-invite message, or if the subscriber wants the establishment of a new call. The SBC may send a query to one of the devices currently used in an on-going session of said subscriber, to the new terminal of the subscriber the invite SIP signalling message was received from, or simply to all the subscriber's devices which are online. The query may be presented to the subscriber as a text on a display of the sub-scriber's device, or be presented as a voice message, etc. The query prompts the subscriber to indicate whether he wants to have performed a session hand-over of his active session(s). The subscriber may reply by pressing a key predefined or indicated by the query as affirmative or disaffirmative key.

If the subscriber affirms the hand-over, the SBC regards the received invite message as a hand-over related re-invite message. If the subscriber declines the hand-over, the SBC regards the received invite message as an re-invite message.

In case, the SBC recognises a hand-over, the SBC 2013 has to initiate a response on the intercepted re-invite in behalf of the UAS 21 which is explicitly not involved in the message flow, e.g., a 200 OK message. Of course, the SBC 2013 has also to intercept the following ACK message sent from the UAC 11*a*. Furthermore, the SBC 2013 has to modify bindings on a media layer with knowledge based on SIP signalling. For example, the "old" session from UAC 11 via SBC 1011, SBC 1013, SBC 2011, and SBC 2013 to UAS 21 has an IP/UDP binding for the media part (RTP) on SBC 2013 for media packets sent from UAC 11 via SBC 1011, SBC 1013, SBC 2011, and SBC 2013 to UAS 21, e.g., a binding of IP/UDP1 with IP/UDP1'.

The "moved" session from UAC 11*a* via SBC 2012 and SBC 2013 to UAS 21 would have an IP/UDP binding for the media part (RTP) on SBC 2013 for media packets sent from UAC 11*a* via SBC 2012 to UAS 21, e.g., a binding of IP/UDP2 with IP/UDP2'. Due to the fact that UAS 21 shall not detect any changes to keep privacy for UAC 11/UAC 11*a*, SBC 2013 has to modify existing binding IP/UDP1 with IP/UDP1' to IP/UDP2 with IP/UDP1' in order to switch RTP packets sent by UAS 21 in direction of UAC 11 in direction of UAC 11*a*.

Once the session hand-over is performed and the associated bindings have been modified, the SBC 2013 terminates the old session in direction of UAC 11 to release all involved instances, i.e., SBC 1011, SBC 1013, and SBC 2011.

Figure 2:
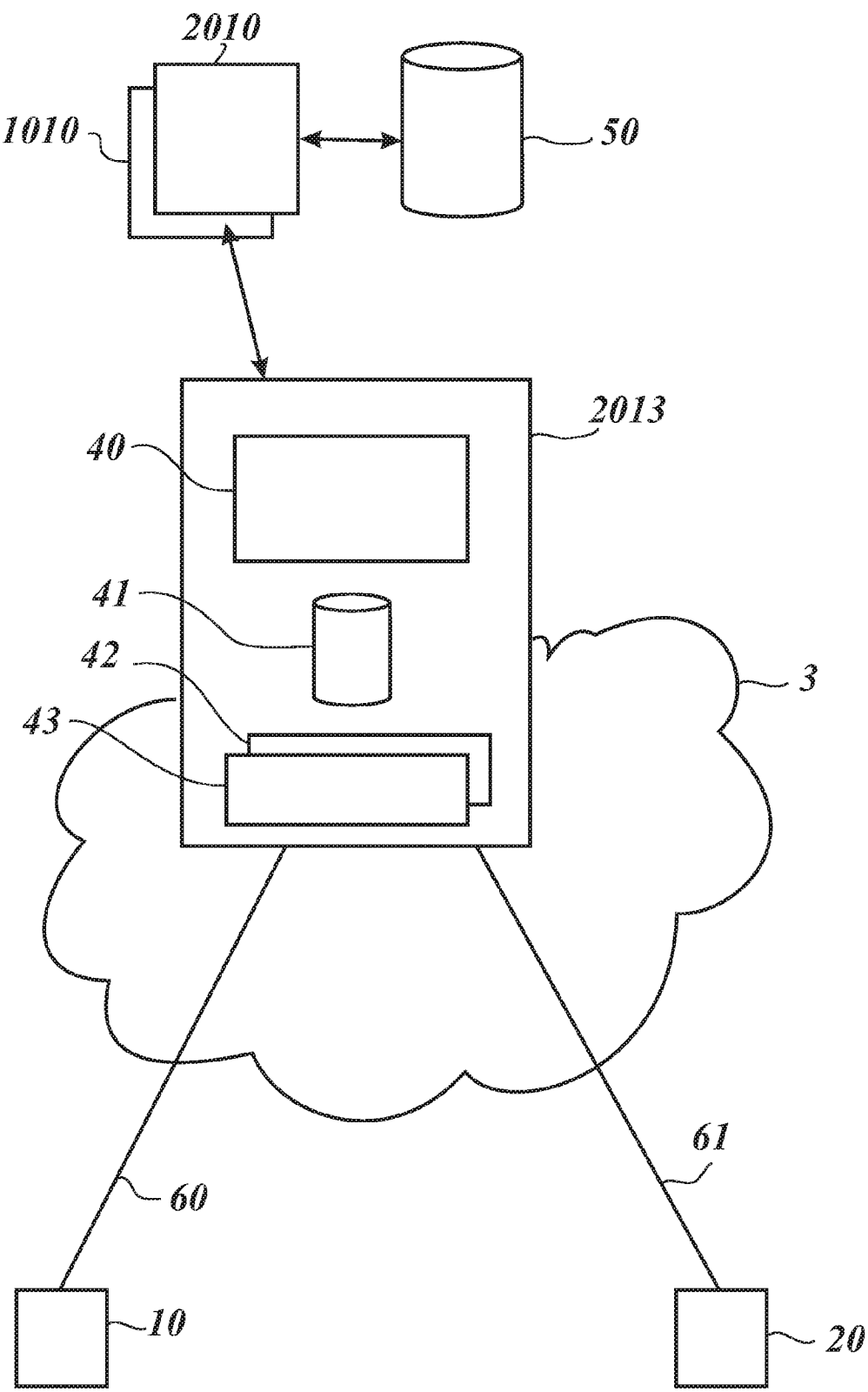
FIG. 2 is a detained view of several parts of the telecommunications network according to an embodiment of the invention.

FIG. 2 shows a detained diagram of the SBC 2013 responsible for the hand-over of the session of FIG. 1. The SBC 2013 comprises a control unit 40, a memory 41, and interfaces 42, 43. The SBC 2013 is part of the telecommunications network 3. By means of the interfaces 42, 43 and the telecommunications network 3, the SBC 2013 is able to receive messages from the terminal 10 of the subscriber 1, the terminal 20 of the subscriber 2, and to communicate with the call signalling servers 1010, 2010 responsible for the home networks 101, 201 of the subscribers 1 and 2, respectively.

The SBC 2013 is composed of one or several interlinked computers, i.e., a hardware platform, a software platform basing on the hardware platform and several application programs executed by the system platform formed by the software and hardware platform. The functionalities of the SBC 2013 are provided by the execution of these application programs. The application programs or a selected part of these application programs constitute a computer software product providing a hand-over service as described in the following, when executed on the system platform. Further, such computer software product is constituted by a storage medium storing these application programs or said selected part of application programs.

The control unit 40 controls the hand-over functionality provided by the SBC 2013. In particular, the control unit 40 intercepts a re-invite session initiation protocol signalling message related to session mobility of said session, and initiates a corresponding session hand-over of said session wherein the media stream of said session is redirected to a new network access point of the first terminal and/or a new terminal. Further, control unit 40 modifies bindings on a layer of said media stream with knowledge based on said re-invite session initiation protocol signalling message and/or other session initiation protocol signalling messages.

The control unit 40 processes the session as two discrete session parts, whereby the first session part 60 is between the first terminal 10 and the new terminal, respectively, and the session border controller 2013, and whereby the second session part 61 is between the session border controller 2013 and the second terminal 20, and wherein the second session part 61 is maintained untouched during the hand-over.

The internal memory 41 may be used to store address information and session ID information extracted from the header and the body of SIP messages handled by the SBC 2013. Alternatively or additionally, the SBC 2013 may store that data in an external database 50. In case the networks 101 and 102 belong to the same provider, this external database 50 may be a dedicated database used only for the storage of the data received from the SBC 2013 and the other SBCs of the network 3. However, home network 101 and home network 201 usually belong to different service providers and have different databases (HSS). In a corresponding embodiment, the database 50 is associated with the call signalling servers 1010, 2010. The call signalling servers 1010, 2010 may also accumulate user-related and session-related data in the database 50. The SBC 2013 may have access to the data accumulated in the database 50 for the use of the data in connection with the hand-over service.

Figure 3:
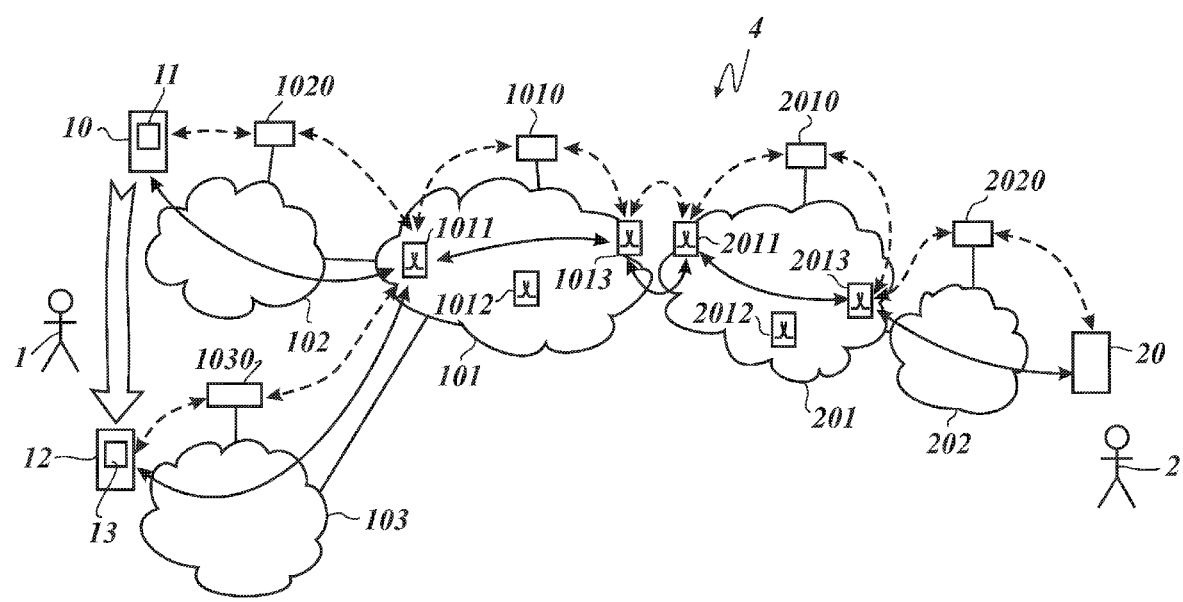
FIG. 3 is a block diagram of a telecommunications network according to another embodiment of the invention.

FIG. 3 shows a packet-based telecommunications network 4 which is almost identical to the packet-based telecommunications network 3 shown in FIG. 1. However, the network access point 203 has been removed and a network access point 103 put instead. The network access point 103 comprises a call signalling server 1030, and is connected to the home network 101 by means of the SBC 1011.

In FIG. 3, the UAC 11 in the terminal 10 is attached to the home network 101 of the subscriber 1 via the SBC 1011. The session is moved to UAC 13 in the terminal 12 located in the IP network access point 103. The IP network access point 103 is attached via the same SBC 1011 to the home network 101 of the subscriber 1 as the network access point 102. Let us assume that a hanover related re-invite message is sent from the terminal 12 in direction of the UAS 20. In this case, the appropriate SBC for intercepting this re-invite message is SBC 1011 where UAC 11 and UAC 13 are connected to, the call state awareness for the existing session is available, and where the re-invite passes this node.

The SBC 2013, which played an important role in the embodiment of FIG. 1, is idle with regard to the hand-over in the embodiment of FIG. 3.

The invention claimed is:

1. A method of providing session mobility to an IP based real-time session in a telecommunications network using the session initiation protocol for the setup and control of the session, whereby the session comprises a media stream between a first terminal associated to a first network access point of the telecommunications network and a second terminal associated to a second network access point of the telecommunications network, wherein the method comprises the steps of:
 intercepting a re-invite session initiation protocol signaling message, generated by the first terminal, related to session mobility of said session at a session-related session border controller of the telecommunications network such that the re-invite session initiation protocol signaling message is prevented from reaching the second terminal to protect the privacy of any movements of the first terminal;
 initiating a corresponding session hand-over of said session by said session border controller, the corresponding session hand-over being transmitted from the session border controller directly to the second terminal; and
 redirecting in said session hand-over the media stream of said session to a new network access point of the first terminal and/or a new terminal.

2. The method of claim 1, wherein the method comprises the further steps of:
 generating said re-invite session initiation protocol signaling message by said first terminal or said new terminal on a corresponding trigger event;
 monitoring one or more IP based real-time sessions operated via said session border controller;
 detecting said re-invite session initiation protocol signaling message by said session border controller based on session-related parameters; and
 adapting existing bindings assigned to media packets of the session by the session border controller for said redirection of the media stream.

3. The method of claim 1, wherein the method comprises the further steps of:
 comparing session ID information and/or address information of re-invite session initiation protocol signaling messages received at said session border controller with session ID information and/or address information of one or more IP based real-time sessions operated via said session border controller;
 detecting a received re-invite session initiation protocol signaling message as associated to one of said IP based real-time sessions operated via said session border controller based on said comparison.

4. The method of claim 1, wherein the method comprises the further steps of:
 detecting said re-invite session initiation protocol signaling message as related to said session hand-over from the first network access point of the first terminal to the new network access point of the first terminal if session ID information of said re-invite session initiation protocol signaling message matches with session ID information of said IP based real-time session, and address information of the terminal where the re-invite session initiation protocol signaling message was received from does not match with address information associated with said IP based real-time session operated via said session border controller.

5. The method of claim 1, wherein the method comprises the further steps of:
 accessing a data base comprising session user data if session ID information of a re-invite session initiation protocol signaling message received at said session border controller does not match with session ID information of any of one or more IP based real-time sessions operated via said session border controller;
 determining by means of said session user data whether a terminal where said re-invite session initiation protocol signaling message was received from and a terminal associated to one of said IP based real-time sessions operated via said session border controller are assigned to a same user;
 requesting a confirmation of the session hand-over from one of the users terminals, if said terminals are assigned to the same user;
 detecting said re-invite session initiation protocol signaling message as related to said session hand-over from the first terminal to the new terminal if said confirmation is received.

6. The method of claim 1, wherein the method comprises the further step of:
 generating said re-invite session initiation protocol signaling message by said first terminal or said new terminal after input of a corresponding command to said first terminal or said new terminal and/or when detecting the availability of a new network access point of the telecommunications network.

7. The method of claim 1, wherein the step of intercepting a re-invite session initiation protocol signaling message related to session mobility of said session at said session-related session border controller of the telecommunications network comprises the steps of:
 filtering out said re-invite session initiation protocol signaling message at said session border controller; and
 blocking said second terminal from the reception of said re-invite session initiation protocol signaling message and all other messages indicating said session hand-over.

8. A session border controller of a telecommunications network for providing session mobility to an IP based real-time session in the telecommunications network using the session initiation protocol for the setup and control of the session, whereby the session comprises a media stream between a first terminal associated to a first network access point of the telecommunications network and a second terminal associated to a second network access point of the telecommunications network, wherein the session border controller comprises a control unit adapted to:
 intercept a re-invite session initiation protocol signaling message, generated by the first terminal, related to session mobility of said session; and
 initiate a corresponding session hand-over of said session wherein the media stream of said session is redirected to a new network access point of the first terminal and/or a new terminal, the corresponding session hand-over being transmitted from the session border controller directly to the second terminal, the interception of the re-invite session initiation protocol signaling message being accomplished to prevent the signaling message from reaching the second terminal to protect the privacy of any movements of the first terminal.

9. The session border controller of claim 8, wherein the control unit is adapted to modify bindings on a layer of said media stream with knowledge based on said re-invite session initiation protocol signaling message and/or other session initiation protocol signaling messages.

10. The session border controller of claim 8, wherein the control unit is adapted to process the session as two discrete session parts, whereby the first session part is between the first terminal and the new terminal, respectively, and the session border controller, and whereby the second session part is between the session-border controller and the second terminal, and wherein the second session part is maintained untouched during the hand-over.

* * * * *